United States Patent Office 3,661,984
Patented May 9, 1972

3,661,984
OXIDATION OF AROMATIC COMPOUNDS
Henryk A. Cyba, Evanston, Ill., assignor to Universal Oil Products Company, Des Plaines, Ill.
No Drawing. Continuation-in-part of application Ser. No. 598,619, Dec. 2, 1966. This application Feb. 17, 1969, Ser. No. 799,949
The portion of the term of the patent subsequent to Feb. 18, 1986, has been disclaimed
Int. Cl. B01j 9/04; C07c 63/02
U.S. Cl. 260—524 R
9 Claims

ABSTRACT OF THE DISCLOSURE

Aromatic compounds, and particularly aromatic hydrocarbons, are treated with an excess of an oxygen-containing gas in the presence of a chain-transfer agent and water at elevated temperatures to prepare oxidized products thereof. This is exemplified by the conversion of p-xylene to terephthalic acid.

---

This application is a continuation-in-part of my copending application, Ser. No. 598,619, filed Dec. 2, 1966, now U.S. Pat. No. 3,428,700 issued Feb. 18, 1969.

This invention relates to a process for the oxidation of aromatic compounds. More particularly, this invention relates to a process whereby aromatic hydrocarbons may be converted to oxidized products thereof, and more particularly to acids, by a process involving a free-radical process.

It has now been discovered that aromatic compounds, and particularly aromatic hydrocarbons, may be treated in such a manner whereby said hydrocarbons are oxidized to the acids thereof. These acids will find a wide variety of uses in the chemical field. For example, benzoic acid may be used as a mordant in calico printing; for seasoning tobacco and improving the aroma thereof; in flavors, perfumes, dentifrices, or as a plasticizer or resin intermediate. A dicarboxylicarbomatic compound such as phthalic acid may be used as an intermediate in the preparation of dyes such as the synthesis of indigo, the manufacture of phthaleins, various fluorescein and eosin dyes, etc.; isophthalic acid may be used in the preparation of polyester and polyurethane resins; while terephthalic acid is used in the production of synthetic resins, fibers and films by combination with glycols, thereby producing such synthetic fibers as Dacron, Mylar, Terylene, etc. For purposes of this invention, the term "aromatic compound" or "aromatic hydrocarbon," as used in the present specification and appended claims, will refer to both non-substituted and alkyl- or cycloalkyl-substituted aromatic compounds or hydrocarbons, the preferred species being the alkyl-substituted compounds.

It is therefore an object of this invention to provide a process for the oxidation of aromatic compounds.

A further object of this invention is to provide a process for converting aromatic compounds, and particularly an alkyl-substituted aromatic hydrocarbon, to an oxidized product thereof in a free-radical reaction.

In one aspect an embodiment of this invention resides in a process for the oxidation of an aromatic compound which comprises treating said aromatic compound with an excess of an oxygen-containing gas in the presence of a chain-transfer agent and water at a temperature in the range of from about 180° to about 250° C., and recovering the resultant oxidized aromatic compound.

A specific embodiment of this invention is found in a process for the oxidation of an aromatic compound which comprises treating p-xylene with an excess of an oxygen-containing gas in the presence of dimethyl sulfoxide and water at a temperature in the range of from about 180° to about 250° C., and recovering the resultant terephthalic acid.

Other objects and embodiments will be found in the following further detailed description of the present invention.

As hereinbefore set forth, the present invention is concerned with a process for obtaining oxidized aromatic compounds by converting an aromatic compound, and particularly an alkyl-substituted aromatic hydrocarbon, to the desired products by treatment with an oxygen-containing gas in the presence of water and a chain-transfer agent. It is also contemplated within the scope of this invention that the process may, if so desired, be effected in the presence of certain catalytic compositions of matter of a type hereinafter set forth in greater detail. The process is effected by treating the particular aromatic hydrocarbon with an oxygen-containing gas in the presence of water and the aforementioned chain-transfer agent which comprises a compound containing an abstractable hydrogen atom at elevated temperature. In the preferred embodiment of this process, the conversion is effected at elevated temperatures ranging from about 180° up to about 250° C. or more, and preferably in a range of from about 225° to about 240° C. Examples of aromatic hydrocarbons which may be oxidized to the desired noncondensed polycyclic hydrocarbon include benzene, toluene, o-xylene, m-xylene, p-xylene, ethylbenzene, n-propylbenzene, cumene (isopropylbenzene), o-diethylbenzene, p-diethylbenzene, 1-methylnaphthalene, 2-methylnaphthalene, 1-ethylnaphthalene, 2-ethylnaphthalene, etc. It is to be understood that the aforementioned compounds are only representative of the hydrocarbons which may be converted according to the process of this invention, and that said invention is not necessarily limited thereto.

The oxidation of the alkyl-substituted aromatic hydrocarbon is effected in the presence of a chain-transfer agent, said agents which may be utilized comprising those compounds which contain at least one hydrogen atom which is abstractable by a free-radical mechanism. Preferred types of compounds which may be used to effect the oxidation comprise those which contain a sulfur substituent, said sulfur-containing compounds including organic sulfur compounds such as thiophenol, methyl mercaptan, ethyl mercaptan, n-propyl mercaptan, isopropyl mercaptan, n-butyl mercaptan, dimethyl sulfoxide, diethyl sulfoxide, etc. These compounds are utilized as chain-transfer agents in contrast to those chain-transfer agents which contain a halogen substituent inasmuch as the use of the sulfur-containing agents will permit the reaction to be effected in a less corrosive manner, thereby permitting the use of materials in the reactors which might normally be subjected to corrosion when utilizing other types of chain-transfer agents. One criterion which these compounds must possess is that said chain-transfer agents possess an active hydrogen atom which is more easily abstractable than the hydrogen atoms on the alkyl substituents of the aromatic hydrocarbons which make up the starting materials for the present process. These chain-transfer agents may be present in the reaction mixture in an amount ranging from about 0.01 up to about 1.0 mole of chain-transfer agent per mole of aromatic hydrocarbon. In addition, the reaction is also effected in the presence of water, said water being present in an amount ranging from about 2 to about 4 moles of aromatic hydrocarbon feed stock. The oxygen-containing gas which is used may comprise a substantially 100% oxygen gas or may be in the form of gaseous mixtures which contain lower concentrations of oxygen such as, for example, air which contains only about 20% oxygen. The latter, namely, air, is preferred due to the low cost and, in addition to acting as an oxidizing agent, will also afford the elevated pressures at which the process of this invention is effected, said pressures ranging from about 2 to about 100 atmospheres or more. The oxygen-containing gas is present in a mole excess over the aromatic hydrocarbon, said oxygen-containing gas being present in an amount in a range of from about 10 to about 500 moles of oxygen-containing gas per mole of alkyl-substituted aromatic hydrocarbon, and preferably in a range of from about 10 to about 75 moles of oxygen per mole of aromatic hydrocarbon.

It is also contemplated within the scope of this invention that the reaction described herein may be effected in the presence of certain catalytic compositions of matter. The preferred catalysts which may be used comprise salts, both inorganic and organic, of the transition metal series including iron, cobalt, nickel, platinum, palladium, ruthenium, rhodium, osmium and iridium, specific examples of these catalysts including ferric nitrate, ferrous nitrate, nickelic nitrate, nickelous nitrate, cobaltic nitrate, cobaltous nitrate, platinum chloride, palladium chloride, ferric sulfate, nickel sulfate, cobalt sulfate, ferric acetate, nickel acetate, cobalt acetate, etc. Of these salts, the preferred catalyst comprise those which are least corrosive in nature, the nitrates falling within this category. In addition, it is also contemplated within the scope of this invention that cupric nitrate, cupric sulfate, cupric acetate, etc., may also be used. While the above discussion of catalysts describes the use of those salts of the transition metal series or copper which are least corrosive in nature, it is also possible to utilize more corrosive salts such as the halides of the transition metals including ferric chloride, ferrous chloride, ferric bromide, ferrous bromide, nickel chloride, nickel bromide, copper chloride, copper bromide, etc., if the apparatus which is used consists of glass or other materials which are resistant to corrosion. Other transition metal salts such as phosphates, oxolates, phenates, benzoates, borates, chromates, dichromates, etc. may also be used providing that the catalysts possess the properties of being soluble in the charge, non-corrosive to the reactor material and stable under the operating conditions of the reaction.

The process of this invention may be effected in any suitable manner and may comprise a batch or continuous type operation. For example, when a batch type operation is used, a quantity of the alkylaromatic hydrocarbon to be converted is placed in an appropriate apparatus such as, for example, a rotating or stirred autoclave which may be lined with glass. The autoclave is sealed after the addition of the chain-transfer agent, water, and if so desired, catalyst, and heated to the desired operating temperature which is in the range of from about 180° to about 250° C., while the oxygen-containing gas is charged thereto in a mole excess within the range hereinbefore set forth. Upon completion of the desired residence time, the autoclave and contents thereof are allowed to cool to room temperature, the excess pressure is discharged and the reaction mixture is recovered. The reaction mixture is then subjected to conventional means for separation and purification, said means including extraction with an organic solvent, distillation to remove the solvent and fractional distillation under reduced pressure to recover the oxidation product comprising a carboxylic or polycarboxylic aromatic acid.

It is also contemplated that the process of this invention may be effected in a continuous manner of operation. When such a type of operation is used, the alkylaromatic hydrocarbon is continuously charged to a reaction zone which is maintained at the proper operating conditions of temperature and pressure, said reaction zone containing a catalyst of the type hereinbefore set forth in greater detail. In addition, the water and chain-transfer agent are also continuously charged thereto through a separate stream. Alternatively, if so desired, the chain-transfer agent may be admixed with the alkylaromatic hydrocarbon prior to entry into said reactor and the mixture charged thereto in a single stream. The oxygen-containing gas is also charged to the reactor through separate means, said gas being present in the reaction zone in a mole excess within the range hereinbefore set forth. Upon completion of the desired residence time, the reactor effluent is continuously withdrawn and subjected to conventional separation means, the unreacted starting materials comprising the alkylaromatic hydrocarbon, the chain-transfer agent and water being recycled to the reaction zone to form a portion of the feed stock while the oxidized aromatic hydrocarbon products are separated and recovered.

It is contemplated within the scope of this invention that the oxidized products of the reaction may also be recovered by other conventional means such as, for example, by extraction with bases, extraction with silica gels, molecular sieves or ion-exchange resins, by a combination of extractive separations with distillation, or by any other type of fractionation.

Examples of oxidized aromatic compounds comprising carboxylic or polycarboxylic acids which may be prepared according to the process of this invention include benzoic acid, phenyl acetic acid, 3-phenyl propionic acid, 4-phenyl butyric acid, phthalic acid, isophthalic acid, terephthalic acid, p-toluic acid, o-toluic acid, m-toluic acid, etc. It is to be understood that the aforementioned compounds are only representative of the class of oxidized aromatic compounds which may be prepared according to the process described herein and that the present invention is not necessarily limited thereto.

The following examples are given to illustrate the process of the present invention which, however, are not intended to limit the generally broad scope of the present invention in strict accordance therewith.

EXAMPLE I

In this example 35.3 grams (0.33 mole) of p-xylene was charged to the glass liner of a rotating autoclave along with 72 grams of water, 1.56 grams of a chain-transfer agent comprising dimethyl sulfoxide and 0.4 grams of the catalyst comprising cupric nitrate. The liner was sealed into the autoclave and 80 atmospheres of air was charged thereto. The autoclave and contents thereof were then heated to a temperature of 230° C. and maintained thereat for a period of one hour. At the end of this time the autoclave and contents thereof were allowed to cool to room temperature. The excess pressure was discharged, the water layer was separated and extracted with ether. The ether extracts were then distilled to remove a major portion of the solvent and admixed with the organic fraction. The organic fraction was subjected to analysis, there being, determined by means of a Gas-Liquid Chromatographic Analysis, the presence of terephthalic acid.

EXAMPLE II

A mixture of 92 grams (1.0 mole) of toluene, 72 grams (4.0 moles) of water, 1.56 grams of a chain-transfer agent comprising dimethyl sulfoxide and 0.4 mole of ferric nitrate which acts as a catalyst is placed in the glass liner of a rotating autoclave. The autoclave is sealed and air is pressed in until an initial pressure of 100 atmospheres is reached. The autoclave is then heated to a temperature of 230° C. and maintained thereat for a period of one hour. At the end of this time heating is discontinued, the autoclave is allowed to return to room temperature and the excess pressure is discharged. The autoclave is opened and the reaction product is recovered, separated from the catalyst and thereafter the water layer is separated from the organic layer. The water layer is extracted with ether and the ether extract is then distilled to remove a major portion of the solvent. The remainder of the ether extract is admixed with the organic fraction which is then subjected to a Gas-Liquid Chromatographic Analysis. The analysis will disclose the presence of benzoic acid.

EXAMPLE III

In this example a mixture of 53 grams (0.5 mole) of o-xylene, 36 grams (2.0 moles) of water, 1.1 grams (0.01 mole) of thiophenol and 0.29 gram (0.01 mole) of nickel nitrate is placed in the glass liner of a rotating autoclave which is thereafter sealed into the autoclave. Following this, air is pressed in until an initial pressure of 90 atmospheres is reached. The autoclave is then heated to a temperature of 230° C. and maintained thereat for a period of 4 hours. At the end of this time heating is discontinued, the autoclave is allowed to return to room temperature, the excess pressure is discharged and the reaction mixture is recovered. After separation from the catalyst the reaction mixture is treated in a manner similar to that set forth in the above examples. A Gas-Liquid Chromatographic Analysis of the reaction product will disclose the presence of phthalic acid.

EXAMPLE IV

A mixture comprising 35.3 grams (0.33 mole) of m-xylene, 72 grams (4.0 mole) of water, 1.56 grams (0.02 mole) of dimethyl sulfoxide, and 0.4 gram (0.001 mole) of chromic nitrate is placed in the glass liner of a rotating autoclave which is thereafter sealed. Oxygen is pressed in until an initial pressure of 75 atmospheres is reached and the autoclave is thereafter heated to a temperature of 225° C. The autoclave and contents thereof are maintained at this temperature for a period of 4 hours, following which, heating is discontinued. After the autoclave has reached room temperature, the excess pressure is vented and the reaction product is recovered. After treatment of said product in a manner similar to that set forth in the above examples, a Gas-Liquid Chromatographic Analysis will disclose the presence of isophthalic acid.

I claim as my invention:

1. A process for the oxidation of an alkyl substituted aromatic compound which comprises treating said aromatic compound with an excess of an oxygen-containing gas in the presence of a chain-transfer agent selected from the group consisting of thiophenol, methyl mercaptan, ethyl mercaptan, n-propyl mercaptan, isopropyl mercaptan, n-butyl mercaptan, dimethyl sulfoxide, and diethyl sulfoxide and water at a temperature in the range of from about 180° to about 250° C., said excess of oxygen-containing gas being sufficient to provide from about 10 to about 500 moles of oxygen per mole of aromatic compound, and recovering the resultant oxidized aromatic compound.

2. The process as set forth in claim 1 in which said process is effected in the presence of a catalyst comprising a salt of a transition metal or copper.

3. The process as set forth in claim 1 in which said oxygen-containing gas is present in a mole excess sufficient to provide from about 10 to about 75 moles of oxygen per mole of aromatic compound.

4. The process as set forth in claim 1 in which said sulfur-containing compound is dimethyl sulfoxide.

5. The process as set forth in claim 1 in which said sulfur-containing compound is thiophenol.

6. The process as set forth in claim 1 in which said aromatic compound is toluene and said oxidized aromatic compound is benzoic acid.

7. The process as set forth in claim 1 in which said aromatic compound is o-xylene and said oxidized aromatic compound is phthalic acid.

8. The process as set forth in claim 1 in which said aromatic compound is m-xylene and said oxidized aromatic compound is isophthalic acid.

9. The process as set forth in claim 1 in which said aromatic compound is p-xylene and said oxidized aromatic compound is terephthalic acid.

References Cited

UNITED STATES PATENTS

| 2,245,528 | 6/1941 | Loder | 260—524 |
| 3,390,173 | 6/1968 | Wallace et al. | 260—524 |
| 3,428,700 | 2/1969 | Cyba | 260—670 |

JAMES A. PATTEN, Primary Examiner

R. S. WEISSBERG, Assistant Examiner

U.S. Cl. X.R.

252—426